(12) United States Patent
Williams

(10) Patent No.: US 9,778,378 B2
(45) Date of Patent: Oct. 3, 2017

(54) DETECTOR CONFIGURATION WITH SEMICONDUCTOR PHOTOMULTIPLIER STRIPS AND DIFFERENTIAL READOUT

(71) Applicants: CERN—EUROPEAN ORGANIZATION FOR NUCLEAR RESEARCH, Génèva (CH); ISTITUTO NAZIONALE DI FISICA NUCLEARE, Frascati (RM) (IT)

(72) Inventor: Crispin Williams, Saint-Genis-Pouilly (FR)

(73) Assignees: CERN EUROPEAN ORGANIZATION FOR NUCLEAR RESEARCH (CH); ISTITUTO NAZIONALE DI FISICA NUCLEARE (IT)

( * ) Notice: Subject to any disclaimer, the term of this patent is extended or adjusted under 35 U.S.C. 154(b) by 0 days.

(21) Appl. No.: 14/889,309

(22) PCT Filed: May 7, 2013

(86) PCT No.: PCT/EP2013/001360
§ 371 (c)(1),
(2) Date: Nov. 5, 2015

(87) PCT Pub. No.: WO2014/180487
PCT Pub. Date: Nov. 13, 2014

(65) Prior Publication Data
US 2016/0097866 A1 Apr. 7, 2016

(51) Int. Cl.
*G01T 1/20* (2006.01)
*G01T 1/202* (2006.01)
*G01T 1/29* (2006.01)
*G01T 1/24* (2006.01)

(52) U.S. Cl.
CPC ............ *G01T 1/2018* (2013.01); *G01T 1/202* (2013.01); *G01T 1/247* (2013.01); *G01T 1/248* (2013.01); *G01T 1/249* (2013.01); *G01T 1/2985* (2013.01)

(58) Field of Classification Search
CPC .................................. G01T 1/20; G01T 1/24
See application file for complete search history.

(56) References Cited

U.S. PATENT DOCUMENTS

| 4,672,207 | A | * | 6/1987 | Derenzo | ............... G01T 1/2018 250/363.02 |
| 7,385,201 | B1 | | 6/2008 | Joung et al. | |
| 2008/0208044 | A1 | * | 8/2008 | Lecoq | .................. A61B 8/0825 600/436 |

(Continued)

FOREIGN PATENT DOCUMENTS

WO 2012152587 A2 11/2012

OTHER PUBLICATIONS

International Search Report for Application No. PCT/EP2013/001360 dated Jan. 17, 2014.

*Primary Examiner* — Marcus Taningco

(57) ABSTRACT

A detector configuration that combines a plurality of elongated semiconductor photo-multiplier sensor strips coupled to a scintillator crystal block with a differential readout that will enhance the time resolution. This is permitted due to a reduction of electronic noise due to reduced cross talk and noise in the ground. In addition, the dead area is minimized and thus the efficiency of the photodetector is enhanced.

14 Claims, 5 Drawing Sheets

(56) References Cited

U.S. PATENT DOCUMENTS

| | | | |
|---|---|---|---|
| 2008/0284428 A1* | 11/2008 | Fiedler | G01R 33/28 324/307 |
| 2010/0219345 A1* | 9/2010 | Franch | G01T 1/1642 250/362 |
| 2010/0243865 A1 | 9/2010 | Olcott et al. | |
| 2014/0246594 A1* | 9/2014 | Pichler | G01T 1/1644 250/366 |

* cited by examiner

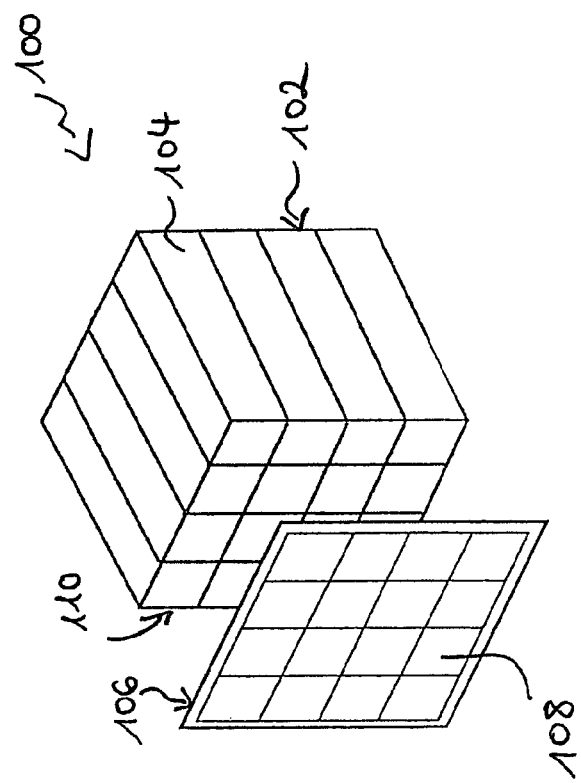
Fig. 1a (State of the Art)

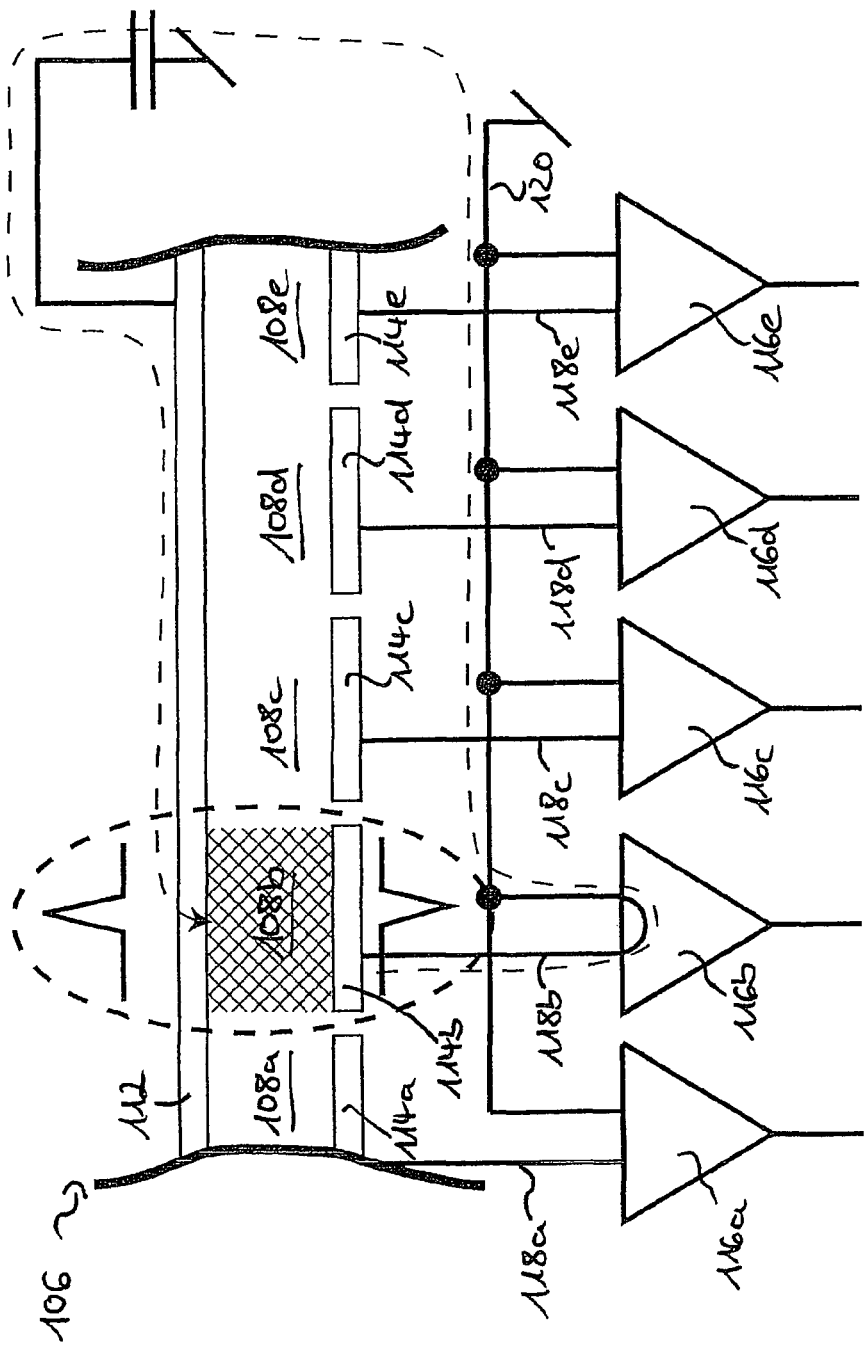
Fig. 1b (State of the Art)

DETECTOR CONFIGURATION WITH SEMICONDUCTOR PHOTOMULTIPLIER STRIPS AND DIFFERENTIAL READOUT

FIELD OF THE INVENTION

The invention relates to a detector configuration employing a scintillator crystal block and a plurality of semiconductor photomultipliers, such as for use in time-of-flight detectors or gamma detectors for positron emission tomography.

BACKGROUND AND RELATED STATE OF THE ART

Detector configurations employing a scintillator crystal block optically coupled to an array of silicon photomultiplier sensor pads have wide applications both in particle physics laboratories as well as in detectors for medical, military and security purposes. Incident particles generate one or many photons in the scintillator crystal. The photons travel through the scintillator crystal until they hit an array of semiconductor photomultiplier sensor pads that is positioned at the surface of the crystal. The Silicon photomultiplier sensor pads typically comprise a plurality of avalanche photodiodes on a common silicon substrate. The dimensions of each single avalanche photodiode can vary from 20 to 100 µm, and their density can amount to $1000/mm^2$ or even more. Each avalanche photodiode in the photomultiplier sensor pad operates in a Geiger-mode and may be coupled to the adjacent photodiodes by means of a polysilicon quenching resistor. A reverse bias voltage (typically in the range of 20V to 100V in silicon) may be applied to each of the avalanche photodiodes, resulting in a gain between $10^5$ and $10^6$. By means of the photoelectric effect, a photon impinging on an avalanche photodiode will create a primary electron in the semiconductor substrate, which will then be amplified into an avalanche of electrons that generates a charge signal that can be read out and analyzed.

A charged particle traversing the crystal can generate a pulse of light by exciting the scintillator or by Cherenkov radiation. This light pulse is the origin of the photons that enter the avalanche photodiode. An energetic charged particle will generate a light pulse with an intensity that depends on its energy, while a gamma can undergo conversion and release an electron with an energy related to the energy of the initial gamma. A more intense light pulse from the scintillator will trigger more of the avalanche photodiodes and thus generate a larger signal. Thus by analysing the signal produced by a collection of these photodiodes, information concerning the timing and amplitude of the light pulse can be extracted.

For instance, detectors of this type may be used for time-of-flight measurements of incident particles that allow the deduction of the velocity of the incident particle. When combined with information on the curvature of the track of the particle in a magnetic field, from which the momentum of the particle can be deduced, the velocity information allows a determination of the mass of the particle. The detector configuration may also be employed as a highly sensitive gamma detector in medical applications, such as for positron emission tomography (PET).

The precision of the timing enhances the value of the measurement. This is clear for the time-of-flight application since more precise time information allow a better mass determination. For medical applications such as PET, precise time information results in clearer images and a reduced dose of radioactive tracers given to the patients.

A gamma detector based on Geiger mode avalanche photodiodes for applications in positron emission tomography is described in international patent application WO2012/152 587 A2. The silicon photomultipliers are arranged in strips that extend along the length of the edge of the scintillator crystal.

FIG. 1a is a schematic perspective view of another conventional detector configuration. The conventional detector configuration 100 comprises a scintillator crystal block 102 that is formed of a plurality of individual elongated scintillator elements 104. The detector configuration 100 further comprises a sensor array 106 that comprises a plurality of silicon photomultiplier sensor pads 108. The pads 108 are quadratic, and their dimensions correspond to the dimensions of the respective end surfaces of the scintillator elements 104. For illustrative purposes, FIG. 1a shows the sensor array 106 detached from the scintillator crystal block 102. However, for operation the sensor array 106 will be mounted to the end surface 110 of the scintillator crystal block 102 so that the sensor pads 108 lie on and correspond to the end surfaces of the scintillator elements 104. This establishes an optical coupling between the scintillator elements 104 and the sensor pads 108, and allows the sensor pads 108 to detect photons generated in the scintillator elements 104. Each of the sensor pads 108 is a silicon photomultiplier pad as described above, and is electrically coupled to a readout means (not shown in FIG. 1a) to detect the signal generated by the incident photons.

A second corresponding sensor array (not shown in FIG. 1a) may be placed on the end surface opposite from the surface 110 to increase the spatial and time resolution.

A conventional readout scheme for the sensor array 106 is shown in the schematic cross sectional view of FIG. 1b. FIG. 1b shows a cutout of one row of the sensor array 106 with five sensor pads 108a to 108e. The sensor pads 108a to 108e are connected to a common electrode 112 that electrically couples the sensor pads 108a to 108e. The common electrode 112 may be a common anode, but may also be a common cathode. As shown in FIG. 1b, the common electrode may be coupled to ground. The detector configuration 100 further comprises a plurality of individual electrodes 114a to 114e coupled to the respective sensor pads 108a to 108e. The electrodes 114a to 114e are separated from one another and are not directly electrically coupled with one another. The electrodes 114a to 114e are cathodes if the common electrode 112 is an anode, and vice versa. Each of the electrodes 114a to 114e is coupled to a respective plurality of corresponding front-end amplifiers 116a to 116e via respective electrical connections 118a to 118e. Each of the front-end amplifiers 116a to 116e may be coupled to a corresponding discriminator (not shown) for subsequent signal analysis. The front-end amplifiers 116a to 116e are coupled to ground via a common electrical link connection 120.

If one of the sensor pads 108a to 108e fires, such as the sensor pad 108b in FIG. 1b, the generated current flows through the electrical connection 118b and the input stage of the front end amplifier 116b and via the link connection 120 into the ground. Hence, the front end amplifier 116b and discriminator measure the current flowing through it with respect to ground. This ground may have many current spikes fed into it from other channels, which may lead to cross talk and timing jitter.

In their research article "Time based readout of a silicon photomultiplier (SiPM) for Time of Flight Positron Emission Tomography (TOF-PET)", IEEE Transactions on Nuclear Science, Vol 58, No. 3, June 2011, P. Jarron et al. explain that the timing resolution may be significantly improved by replacing the common ground connection of FIG. 1b with a differential readout, wherein each of the sensor pads 108a to 108e has its own separate anode and cathode, which are both connected to the inputs of a corresponding differential current mode amplifier stage. A differential input connection has the advantage of superior rejection of ground and supply-voltage noise, which is a key feature for a fast multi-channel readout. However, for an array of SiPM detectors, the differential connection of each of the pads is complex and expensive. In addition, the electrical connections of the individual sensor pads lead to a dead area around each pad. These dead areas effectively reduce the efficiency of the photodetector.

What is required is a detector configuration that combines an improved timing with a high efficiency at the same time reducing the manufacturing complexity

OVERVIEW OF THE INVENTION

This objective is achieved with the detector configuration and detection method according to the independent claims. The dependent claims relate to preferred embodiments.

A detector configuration according to the present invention comprises a scintillator crystal block and a plurality of semiconductor photomultiplier sensor elements optically coupled to said scintillator crystal block, wherein said sensor elements comprise or are elongated strips. Readout means are electrically coupled to said plurality of sensor elements, wherein said detector configuration is adapted to differentially couple each sensor element to said readout means.

The inventors found that differential readout (as compared to single-ended readout) reduces cross talk between channels, and the reduced cross talk substantially reduces the noise in a multicell system. Elongating the readout sensors into strips that extend to the edge of the detector area allows a differential readout without any additional dead space. As a result, a detector configuration with excellent timing resolution and high efficiency can be achieved. The reduction in the amount of circuitry and electrical connections reduces the complexity of both manufacturing and operating the detector configuration, which is a particular advantage for large detectors.

In a preferred embodiment, each said sensor element comprises its own anode connection and its own cathode connection, wherein said detector configuration may be adapted to differentially couple said anode connection and said cathode connection to said readout means.

The differential readout or coupling, in the sense of the present invention, may denote a configuration in which the readout means are directly coupled to the respective anode connections and cathode connections of the individual sensor elements.

In a preferred embodiment, at least two of said sensor elements do not share a common electrode, such as a common anode or a common cathode.

Preferably, no two of said sensor elements share a common electrode, such as a common anode or a common cathode.

In a preferred embodiment, said readout means comprises an amplification stage, wherein said detector configuration is adapted to differentially couple each said sensor element to said amplification stage.

The differential coupling of the individual sensor elements to the amplification stage avoids cross talk from neighboring channels, and hence improves the timing resolution.

In a preferred embodiment, said readout means comprises a plurality of amplification stages and/or a plurality of discriminators corresponding to said plurality of sensor elements, wherein each said sensor element is differentially coupled to a corresponding amplification stage or discriminator, respectively.

The sensor elements may be placed side-by-side along a side surface of said scintillator crystal block. Preferably, said side surface may be the shorter side of said crystal block, i.e. an end surface of said scintillator crystal block.

In an embodiment of the present invention, said scintillator crystal block may be a monolithic block.

In an alternative detector configuration, said scintillator crystal block comprises a plurality of elongate scintillator elements arranged in a matrix of rows and columns.

The division of the scintillator crystal block into a plurality of separate scintillator elements provides for a matrix-encoded readout and allows the enhancement of the spatial resolution. The scintillator elements may serve as individual light guides that guide a light signal from an incident particle to the sensor element located at its side surface.

In a preferred embodiment, a number of said elongate sensor elements optically coupled to said scintillator crystal block is larger than the square root of the number of said scintillator elements in said scintillator crystal block. Preferably, said number of said sensor elements optically coupled to said scintillator crystal block is at least two times larger than the square root of the number of said scintillator elements in said scintillator crystal block, and in particular at least three times larger than the square root of the number of said scintillator elements in said scintillator block.

Each said sensor element may provide an independent time measurement. The inventors found that increasing the number of sensor elements allows an improvement of the time resolution by taking averages from a plurality of sensor elements, and at the same time allows the discard of early pulses that may be caused by dark counts. As a result, the timing performance can be improved, and the effect of the dark count rate can be minimized.

In a preferred embodiment, a width of said sensor element may be smaller than a width of a scintillator element to which said sensor element is optically coupled.

Said width of said sensor element may be a width measured in a direction perpendicular to a length direction of said elongated sensor element. Said width of said scintillator element may be a width measured along the same direction, i.e., perpendicular to said length direction.

By choosing the width of the sensor element smaller than a corresponding width of a scintillator element to which the sensor element is optically coupled, the number of sensor elements per scintillator element may be increased, which permits an independent readout that improves the timing and allows to discard dark count signals.

The inventors found that the optimal choice of the number of sensor elements per scintillator element balances the increase in the timing performance with the additional complexity in manufacturing and readout, and also depends on the size of the strips.

Good results can be achieved in a detector configuration in which said width of said sensor element is at least 1.5 times or at least two times smaller than said width of said scintillator element, and preferably at least three times smaller than said width of said scintillator element, particularly at least four times smaller.

In a preferred embodiment, a length of said sensor elements is at least five times larger than a width of said sensor elements, and preferably at least ten times larger or twenty times larger.

Preferably, said sensor elements extend from one edge of said scintillator crystal block to an opposite edge of said scintillator crystal block.

Sensor elements that extend over the entire length of the end of the scintillator block permit a readout of the signals at the edge of the sensor elements, and hence avoid central connections that would lead to an unwanted dead area.

If central connections are desired, they can be formed as a through silicon via (TSV) to reduce the dead area.

In a preferred embodiment, said plurality of semiconductor photomultiplier sensor elements comprise a first subset of semiconductor photomultiplier sensor elements optically coupled to said scintillator crystal block at a first side surface of said scintillator crystal block, and a second subset of semiconductor photomultiplier sensor elements optically coupled to said scintillator crystal block at a second side surface of said scintillator crystal block. Said second side surface may be opposite from said first side surface.

By providing arrays of semiconductor photomultiplier sensor elements at opposing ends of the scintillator crystal block, the spatial detector resolution may be improved. In particular, the location of an event along a direction perpendicular to a plane of the sensor arrays may be determined from the time difference of charge signals detected at opposing ends of the scintillator crystal. The improved spatial resolution leads to a further improvement of time resolution.

Said sensor elements in said first subset may be oriented perpendicular to said sensor elements in said second subset. The perpendicular orientation allows a further enhancement of the spatial resolution.

Said semiconductor photomultiplier sensor elements may be silicon photomultiplier sensor elements.

Said sensor elements may each comprise a plurality of semiconductor avalanche photodiodes, such as silicon avalanche photodiodes.

In a preferred embodiment, said sensor elements each comprise a plurality of semiconductor photomultiplier cells or pads arranged in a row, such as silicon photomultiplier pads, wherein adjacent cells or pads in said row are electrically connected.

Each said cell or pad preferably comprises a plurality of semiconductor avalanche photodiodes, such as silicon avalanche photodiodes.

In a preferred embodiment, said sensor elements each comprise a first set of electrical connection elements for electrically coupling said sensor element to said readout means, and a second set of electrical connection elements for electrically coupling said sensor element to said readout means, wherein said first set of electrical connection elements and said second set of electrical connection elements are positioned at opposing ends of said sensor element along a length direction thereof.

Reading out the signals at opposing ends of the sensor elements allows the improvement of the spatial resolution of the detector element. In particular, the position of an event or hit along the length of each elongate sensor element may be determined from the time difference of detection signals collected from the first set of electrical connection elements and the second set of electrical connection elements, respectively.

Said first set of electrical connection elements and said second set of electrical connection elements may each comprise both an anode element and a cathode element.

The invention further relates to a detection method comprising the steps of providing a detector configuration with a scintillator crystal block, a plurality of semiconductor photomultiplier sensor elements optically coupled to said scintillator crystal block, wherein said sensor elements comprise or are elongated strips, and a readout means electrically coupled to said plurality of sensor elements. The method further comprises a step of differentially coupling each said sensor element to said readout means.

Said detector configuration may be a detector configuration with some or all of the features as described above.

DETAILED DESCRIPTION OF PREFERRED EMBODIMENTS

The features and advantages of the present invention will become best apparent from a detailed description of preferred embodiments in conjunction with the accompanying drawings, in which:

FIG. 1a is a schematic perspective view of a conventional detector configuration employing an array of silicon photomultiplier pads coupled to an array of scintillating crystals;

FIG. 1b is a schematic cross-sectional view illustrating the electrical connection of the conventional detector configuration of FIG. 1a via a common ground electrode;

FIG. 2 is a perspective schematic view of a detector configuration 10 according to the present invention. The detector configuration 10 may be used in a time-of-flight detector in a particle physics experiment, but may also be used as a gamma detector in medical, military and security applications, such as in the field of positron emission tomography (PET).

Figure 2:
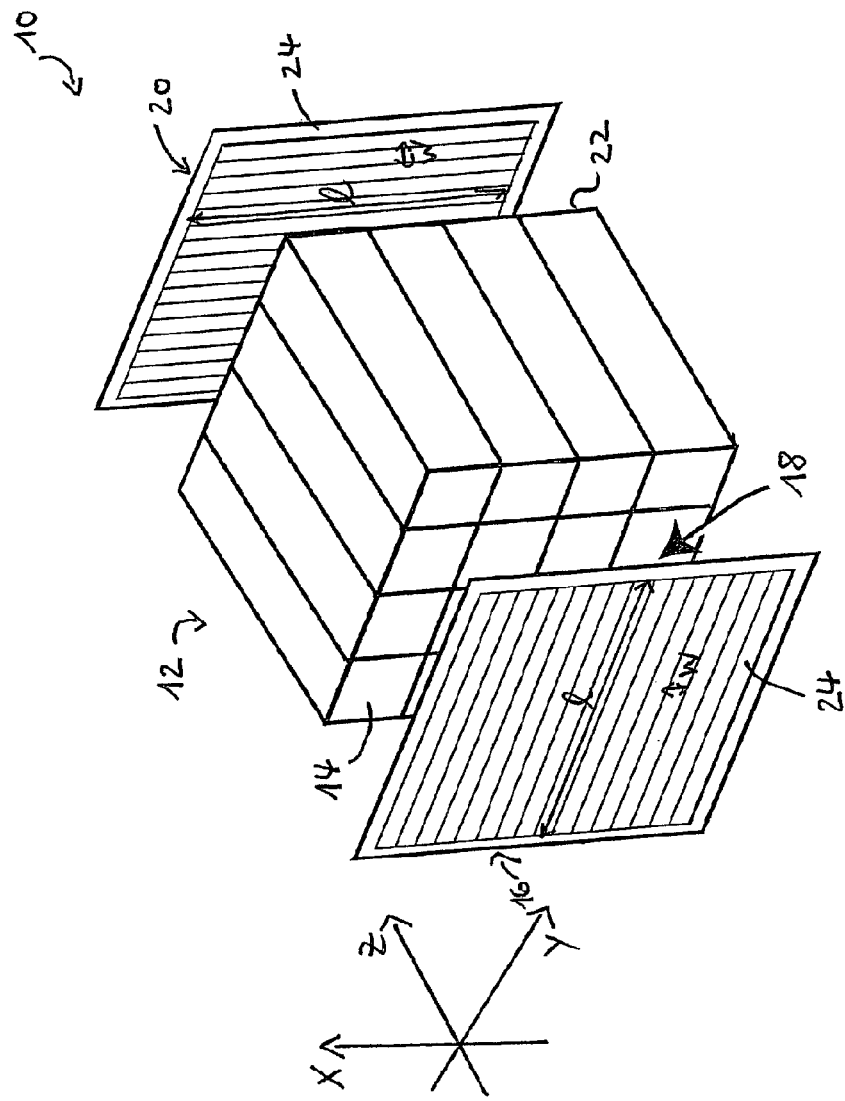
FIG. 2 is a schematic perspective view of a detector configuration according to an embodiment of the present invention.

The detector configuration 10 comprises a scintillator crystal block 12 formed of a plurality of elongate scintillator elements 14 arranged in a matrix of rows and columns. FIG. 2 shows a configuration with 16 scintillator elements 14 arranged in four rows and four columns. However, this is a mere example, and scintillator crystal blocks with any number of rows and columns may be employed. Adjacent scintillator elements 14 may be optically separated from one another by means of an interposed reflective foil or an air gap.

Typical sizes for medical PET detectors are 3 mm×3 mm×15 mm. The 3 mm×3 mm can be larger or smaller depending on the size of the SiPM cell employed. The length (15 mm) needs to be as large as possible to increase sensitivity of the device; however, a greater length degrades the time (and energy) resolution.

The scintillator elements 14 shown in FIG. 2 are cuboid in shape with a square cross section. However, the invention is not so limited, and depending on the applications and the manufacturing constraints scintillator elements 14 with a rectangular cross section or other shapes may be employed as well.

The detector configuration shown in FIG. 2 further comprises a first sensor array 16 physically and optically coupled to a first end surface 18 of the scintillator crystal block 12, and a second sensor array 20 coupled to an opposite second end surface 22 of the scintillator crystal block 12 in a way that each of the scintillator elements 14 is optically coupled to the first sensor array 16 at a first end thereof and is optically coupled to the second sensor array 20 at a second opposite end thereof.

In the schematic drawing of FIG. 2, the first sensor array 16 and the second sensor array 20 are shown detached from the scintillator crystal block 12. However, this is for illustrative purposes only, and it should be understood that during operation and for readout and analysis the first sensor array 16 and the second sensor array 20 are placed and mounted onto the respective end surfaces 18 and 22 of the scintillator crystal block 12 so to establish an optical contact between the scintillator crystal block 12 and the sensor arrays 16, 20.

The first sensor array 16 and second sensor array 20 are generally identical to one another, apart from the fact that the second sensor array 20 is placed onto the second end surface 22 in an orientation that can be rotated by 90° with respect to the orientation of the first sensor array 16 placed onto the first side surface 18. The perpendicular orientation of the sensor arrays 16, 20 enhances the spatial resolution of the detector configuration 10.

The first sensor array 16 and the second sensor array 20 each comprise a plurality of silicon photomultiplier strips 24 that are arranged in parallel and adjacent to one another. In the configuration shown in FIG. 2, the first sensor array 16 and the second sensor array 20 each comprise a number of 16 silicon photomultiplier strips 24, and hence each of the scintillator elements 14 will be in optical contact with four silicon photomultiplier strips 24 of the first sensor array 16 and four silicon photomultiplier strips 24 of the second sensor array 20. But this configuration is a mere example, and both the first sensor array 16 and the second sensor array 12 may comprise a smaller or a larger number of silicon photomultiplier strips 24.

In the configuration shown in FIG. 2, the silicon photomultiplier strips 24 extend over the entire length l of the scintillator crystal block 12 from one edge thereof to an opposite end thereof.

In general, the size of a SiPM cell (or strip) is limited in size. This is because the dark count rate increases (linearly) with the area and also the electrical capacitance of the cell increases linearly with area The increased dark count rate leads to problems, since a dark count occurring just prior to the event of interest destroys the timing. The increased capacitance just makes it increasingly difficult to design fast electronics. However, strips, if they are long, may give an advantage since they could be considered as transmission lines.

As an example, the strips 24 may have a length of 15 mm and a width of 0.75 mm.

Each silicon photomultiplier strip 24 is a photodiode run at a high gain such that a primary electron generated by an incident photon by means of the photoelectric effect initiates an avalanche or Geiger discharge. To limit the discharge from spreading over the whole device, each silicon photomultiplier strip 24 is subdivided into small pixels of a limited area with the voltage supplied through a limiting resistor. Each pixel corresponds to an avalanche photodiode, as is generally known from the prior art. The charge of the signal generated by a single avalanche photodiode undergoing a Geiger discharge is given by the capacitance of the pixel (diode) times the over-voltage applied. The overvoltage is the voltage above the breakdown voltage and typically amounts to several volts. The generated charge is typically in the range of $10^6$ electrons.

The silicon photomultiplier strip 24 may in general be formed of a plurality of square photomultiplier cells arranged in a row, wherein adjacent cells in the row are electrically connected. In this way, the strips 24 may be formed of square silicon photomultiplier cells that are readily commercially available from a number of suppliers.

Figure 3:
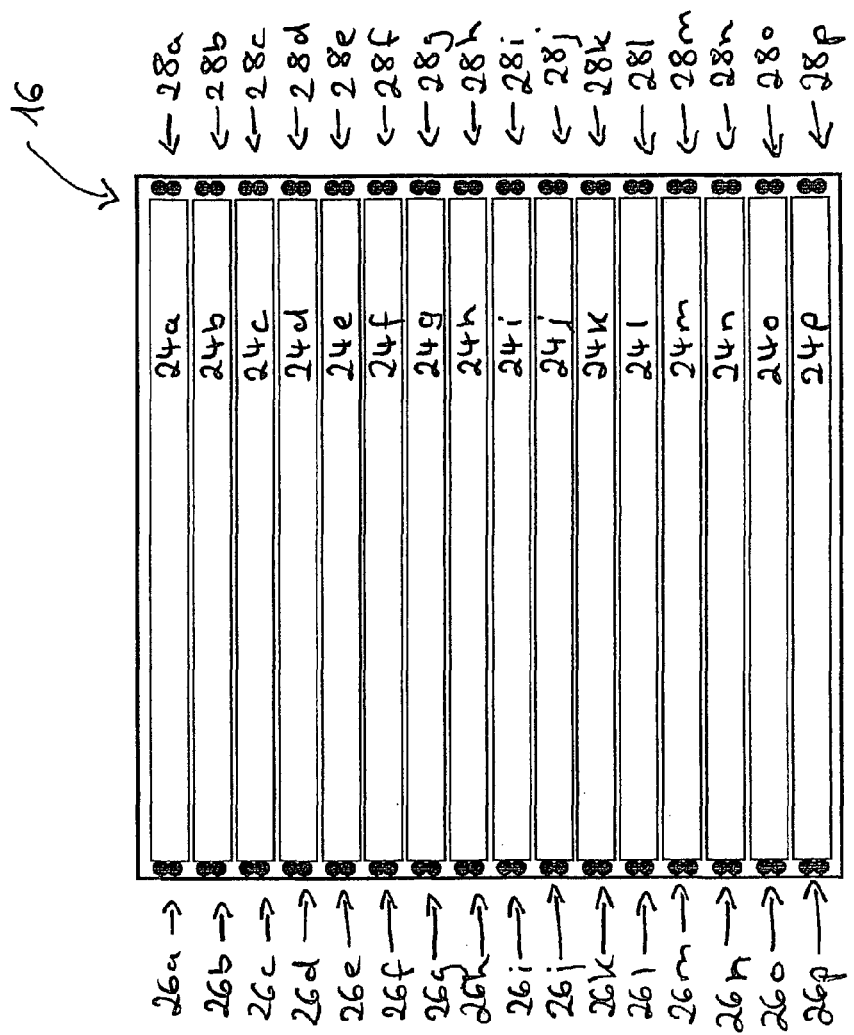
FIG. 3 is a front view showing the readout connections of the silicon photomultiplier strips of the detector configuration in FIG. 2.

The electrical connections and readout of the detector configuration 10 will now be explained in further detail with reference to FIG. 3. FIG. 3 is a front view of the first sensor array 16, and shows 16 adjacent silicon photomultiplier strips 24a to 24p. Each of the strips 24a to 24p has a first set of connection elements 26a to 26p at a first surface side thereof, and a second set of connection elements 28a to 28p formed at an opposite surface side thereof Each of the first set of connection elements 26a to 26p and the second set of connection elements 28a to 28p comprises both an anode connection and a cathode connection.

Figure 4:
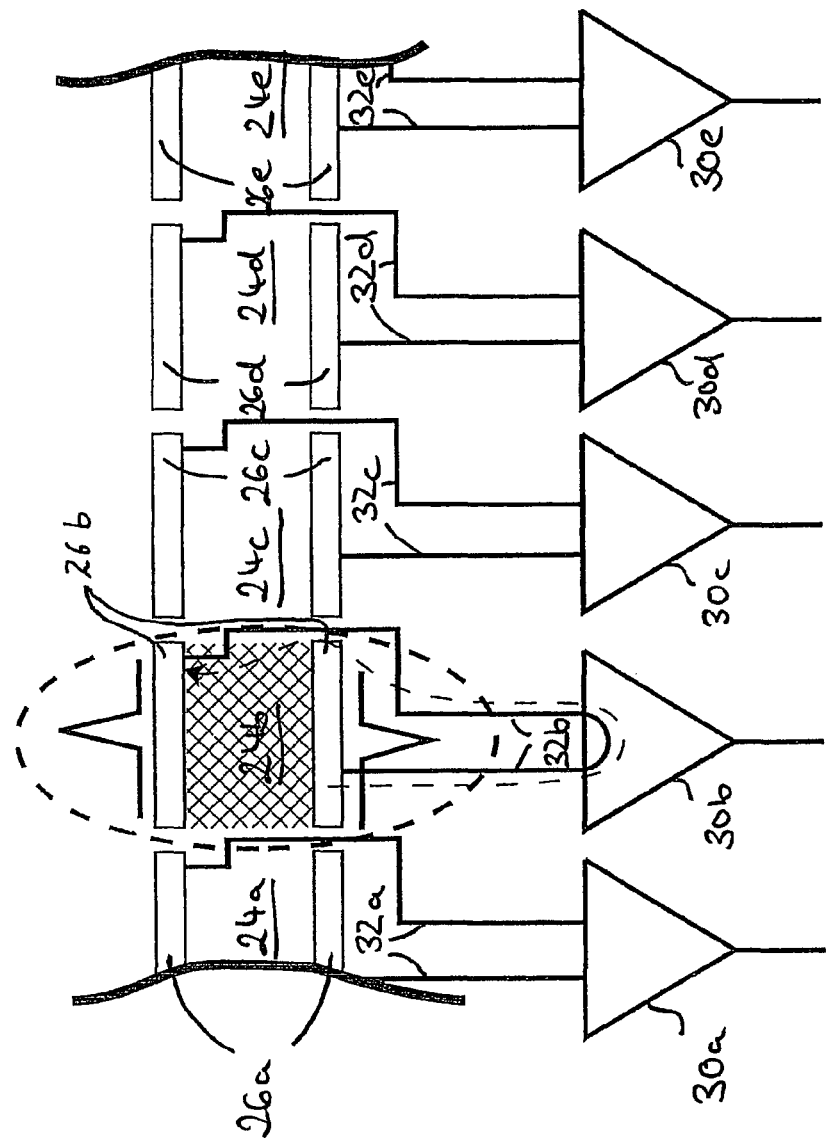
FIG. 4 shows the differential readout connections of the detector configuration according to the present invention.

The electrical connection of the connection elements 26a to 26p and 28a to 28p to the readout means is illustrated in greater detail in FIG. 4, which shows a schematic view along the side surface of the first sensor array 16. FIG. 4 is a cutout, which, for ease of illustration, only shows five silicon photomultiplier strips 24a to 24e with corresponding connection elements 26a to 26e. One of the connection elements 26a to 26e is the cathode element, whereas the opposite connection element 26a to 26e is the respective anode element. As can be taken from FIG. 4, the anodes and cathodes of the individual silicon photomultiplier strips 24a to 24e are not directly electrically or physically connected. Hence, each of the silicon photomultiplier strips 24a to 24e has its own and separate set of anodes and cathodes 26a to 26e. As can be taken from FIG. 4, the anode and cathode electrodes 26a to 26e of each of the silicon photomultiplier strips 24a to 24e are connected to the inputs to corresponding front-end amplifiers 30a to 30e via respective pairs of electrical connections 32a to 32e. Such a readout connection is known as fully differential.

Corresponding anode and cathode elements, front-end amplifiers and electrical connections are provided at the opposite ends of the silicon photomultiplier strips 24a to 24e.

In contrast to the state of the art as explained with reference to FIG. 1b above, the differential coupling of the silicon photomultiplier strips 24a to 24e to the front end amplifiers 30a to 30e avoids a common ground connection. If an avalanche in generated in the silicon photomultiplier strip 24b, the corresponding charge will be locally supplied via the electrical connections 32b to the corresponding front end amplifier 30b only, and there is no current injected into the ground. The discriminator (not shown) coupled to the front end amplifier 30b senses the difference between the plus and minus inputs (rather than measuring the signal with respect to the ground), which results in the reduction of jitter and an improved timing.

As an additional advantage, the elongate silicon photomultiplier strips 24 transport the readout signal to the side edges of the detector, and thereby allow an easy access to both the anode and the cathode electrode. Compared with a conventional pad geometry as shown in FIG. 1a, this reduces the amount of electrical connections in the sensor arrays 16, 20 and hence the dead area, thereby enhancing the efficiency of the photodetector.

If an avalanche is triggered in one of the silicon photomultiplier strips 24a to 24h, independent charge signals can be collected from the first set of collection elements 26a to 26p and the second set of connection elements 28a to 28p. The time difference between the signals allows the derivation of the position of the hit along the strip, whereas the time of the hit may be computed from the sum of the detection times (i.e. the average) of the signals. Due to the independent measurements at both ends of the strips 24, jitter introduced by the electronics and time to digital converters can be reduced by a factor $\sqrt{2}$.

Similarly, the time difference of signals measured with the first sensor array 16 and the second sensor array 20 allows the determination of the position of the hit along the length of the corresponding scintillator element 14, in a direction z perpendicular to the plane xy of the sensor arrays 16, 20. This determination reduces parallax errors and also can improve the time resolution.

One of the problems conventionally associated with silicon photomultipliers is their comparatively high dark count rate (DCR). A dark count is a random firing of a silicon avalanche photodiode. If a dark count happens a short time before the light pulse of interest, both pulses will be merged together and the time attributed to the event will be early due to the electronics firing early on this dark count. Moreover, after a dark count signal the electronics take some time to recover, and during this recovery time the time resolution of the electronics is degraded. In a conventional silicon photomultiplier system, it is hence difficult to determine whether a timing is accurate or is an early timing due to a dark count pulse or a delayed timing caused by electronics recovery time.

The inventors found that the effect of dark counts can be minimized by decreasing the width w of the silicon photomultiplier strips 24 such that each scintillator element 14 is optically coupled to a plurality of silicon photomultiplier strips 24. In the configuration shown in FIG. 2, a width w of the silicon photomultiplier strip 24 is four times smaller than a width and length of the scintillator elements 14, and hence each of the scintillator elements 14 is coupled to four silicon photomultiplier strips 24 of the first sensor array 16 at one side surface thereof, and is further coupled to four silicon photomultiplier strips 24 of the second sensor array 20 at the opposite side surface 22 thereof. Reduction of the area of the silicon photomultiplier strips 24 reduces the number of dark counts. At the same time, each of the strips 24 allows to make an independent time measurement. An increase in the number of strips therefore allows an improvement in the timing by taking an average of independent measurements, and further allows early pulses caused by dark counts to be discarded. The inventors found this configuration particularly advantageous in applications in which the time of arrival of a first photon needs to be determined.

The detailed description of the preferred embodiments and the figures merely serve to illustrate the invention and the advantageous effects it achieves, but should not be understood to imply any limitation. The scope of the invention is to be determined solely by means of the appended claims.

A Detector Configuration with Semiconductor Photomultiplier Strips and Differential Readout

REFERENCE SIGNS 10 detector configuration
12 scintillator crystal block of detector configuration 10
14 scintillator element of scintillator crystal block 12
16 first sensor array
18 first side surface of scintillator crystal block 12
20 second sensor array
22 second side surface of scintillator crystal block 12
24 silicon photomultiplier strip
24a-24p silicon photomultiplier strips
26a-26p first set of connection elements of silicon photomultiplier strips 24a-24h
28a-28p second set of connection elements of silicon photomultiplier strips 24a-24h
30a-30d front end amplifiers
32a-32d electrical connections
100 conventional detector configuration
102 scintillator crystal block of detector configuration 100
104 scintillator element of scintillator crystal block 102
106 sensor array
108 sensor pads of sensor array 106
108a-108e sensor pads
110 side surface of scintillator crystal block 102
112 common anode of sensor pads 108a-108e
114a-114e cathodes of sensor pads 108a-108e
116a-116e front end amplifiers
118a-118e electrical connections
120 link connection

The invention claimed is:

1. A detector configuration, comprising:
a scintillator crystal block comprising a plurality of elongated scintillator elements arranged in a matrix of rows and columns;
a plurality of semiconductor photomultiplier sensor elements optically coupled to said scintillator crystal block, wherein said sensor elements comprise elongated strips and wherein said sensor element has a width (w) in a direction perpendicular to a length direction, said width (w) being at least two times smaller than a width of a scintillator element to which said sensor element is optically coupled; and
readout means electrically coupled to said plurality of sensor elements, wherein said detector configuration is adapted to differentially couple each said sensor element to said readout means.

2. The detector configuration according to claim 1, wherein each said sensor element comprises its own anode connection and its own cathode connection, and wherein said detector configuration is adapted to differentially couple said anode connection and said cathode connection to said readout means.

3. The detector configuration according to claim 1, wherein at least two of said sensor elements do not share a common electrode.

4. The detector configuration according to claim 1, wherein said readout means comprises an amplification stage, wherein said detector configuration is adapted to differentially couple each said sensor element to said amplification stage.

5. The detector configuration according to claim 1, wherein a number of said sensor elements optically coupled to said scintillator crystal block is larger than the square root of the number of said scintillator elements in said scintillator crystal block.

6. The detector configuration according to claim 1, wherein a length (l) of said sensor element is at least five times larger than a width (w) of said sensor element.

7. The detector configuration according to claim 1, wherein said sensor elements extend from one edge of said scintillator crystal block to an opposite edge of said scintillator crystal block.

8. The detector configuration according to claim 1, wherein said plurality of semiconductor photomultiplier sensor elements comprise a first subset of semiconductor photomultiplier sensor elements optically coupled to said scintillator crystal block at a first side surface of said scintillator crystal block, and further comprises a second subset of semiconductor photomultiplier sensor elements optically coupled to said scintillator crystal block at a second side surface of said scintillator crystal block, wherein said second side surface is opposite from said first side surface.

9. The detector configuration according to claim 1, wherein said sensor elements each comprise a plurality of semiconductor avalanche photodiodes.

10. The detector configuration according to claim 1, wherein said sensor elements each comprise a plurality of semiconductor photomultiplier cells arranged in a row, wherein adjacent cells in said row are electrically connected, wherein each cell comprises a plurality of semiconductor avalanche photodiodes.

11. The detector configuration according to claim 1, wherein said sensor elements each comprise a first set of electrical connection elements for electrically coupling said sensor element to said readout means and a second set of electrical connection elements for electrically coupling said sensor element to said readout means, wherein said first set of electrical connection elements and said second set of electrical connection elements are positioned at opposing ends of said sensor element along a length direction thereof.

12. The detector configuration according to claim 11, wherein said readout means is adapted to determine a time difference of signals received from said first set of electrical connection elements and said second set of electrical connection elements, and to determine a location of a detection event along a length direction of said sensor element based on said time difference.

13. A detection method, comprising the steps of:
providing a detector configuration with a scintillator crystal block comprising a plurality of elongated scintillator elements arranged in a matrix of rows and columns, a plurality of semiconductor photomultiplier sensor elements optically coupled to said scintillator crystal block, wherein said sensor elements comprise elongated strips, and wherein said sensor element has a width (w) in a direction perpendicular to a length direction, said width (w) being at least two times smaller than a width of a scintillator element to which said sensor element is optically coupled and a readout means electrically coupled to said plurality of sensor elements; and
differentially coupling each said sensor element to said readout means.

14. The detection method according to claim 13, wherein said detector configuration is a detector configuration according to claim 1.

* * * * *